(12) United States Patent
Culkin (10) Patent No.: US 10,928,500 B2
(45) Date of Patent: Feb. 23, 2021

(54) DISTRIBUTED CLUTTER MOTION SUPPRESSION THROUGH MULTIPLE MOVING TRANSMIT PHASE CENTERS

(71) Applicant: SRC, Inc., North Syracuse, NY (US)

(72) Inventor: Daniel R. Culkin, Cazenovia, NY (US)

(73) Assignee: SRC, Inc., North Syracuse, NY (US)

( * ) Notice: Subject to any disclaimer, the term of this patent is extended or adjusted under 35 U.S.C. 154(b) by 404 days.

(21) Appl. No.: 15/876,789

(22) Filed: Jan. 22, 2018

(65) Prior Publication Data

US 2019/0227157 A1    Jul. 25, 2019

(51) Int. Cl.
| | | |
|---|---|---|
| G01S 13/524 | (2006.01) | |
| G01S 13/72 | (2006.01) | |
| G01S 13/58 | (2006.01) | |
| G01S 13/90 | (2006.01) | |
| G01S 7/41 | (2006.01) | |
| G01S 7/292 | (2006.01) | |

(52) U.S. Cl.
CPC .......... *G01S 13/5244* (2013.01); *G01S 7/292* (2013.01); *G01S 7/414* (2013.01); *G01S 7/415* (2013.01); *G01S 13/582* (2013.01); *G01S 13/723* (2013.01); *G01S 13/90* (2013.01)

(58) Field of Classification Search
CPC ...... G01S 13/5244; G01S 7/292; G01S 7/414; G01S 7/415; G01S 13/582; G01S 13/723; G01S 13/90
USPC .......................................................... 342/90
See application file for complete search history.

(56) References Cited

U.S. PATENT DOCUMENTS

| | | | | |
|---|---|---|---|---|
| 5,150,310 | A * | 9/1992 | Greenspun | G01S 5/06 342/451 |
| 7,944,390 | B2 * | 5/2011 | Krieger | G01S 13/904 342/25 F |
| 7,994,965 | B2 * | 8/2011 | Longstaff | G01S 13/347 342/59 |
| 8,134,490 | B2 * | 3/2012 | Gebert | G01S 13/904 342/25 R |

(Continued)

FOREIGN PATENT DOCUMENTS

| | | | | |
|---|---|---|---|---|
| EP | | 1989570 B1 * | 7/2016 | ........... H01Q 21/205 |
| WO | WO-2008134815 A1 * | | 11/2008 | ............. H01Q 13/22 |

*Primary Examiner* — Timothy A Brainard
*Assistant Examiner* — Nuzhat Pervin
(74) *Attorney, Agent, or Firm* — George R. McGuire; Bond Schoeneck & King (57) ABSTRACT

A radar system located on an antenna array mounted on a moving carrier and including plurality of antenna elements; a transmitter portion coupled to the antenna and configured to transmit a plurality of transmit beams, each including a corresponding orthogonal transmit waveform of a plurality of orthogonal transmit waveforms, each of the plurality of transmit beams having a transmit phase center spatially located at a respective point along the antenna array, the transmitter portion being configured to transmit each transmit beam during at least a portion of a pulse repetition interval, wherein the transmitter portion is configured to shift the transmit phase center of each transmit beam for each pulse repetition interval to a respective point along the antenna array in a direction opposite the movement of the carrier, such that a speed of the respective transmit phase center of each beam remains is reduced.

16 Claims, 5 Drawing Sheets

(56) References Cited

U.S. PATENT DOCUMENTS

| | | | | |
|---|---|---|---|---|
| 8,854,255 B1* | 10/2014 | Ehret | ............... | G01S 13/538 |
| | | | | 342/160 |
| 9,035,774 B2* | 5/2015 | Scott | ............... | G01S 5/12 |
| | | | | 340/572.1 |
| 9,638,793 B2* | 5/2017 | Wang | ............... | G01S 13/288 |
| 10,222,467 B2* | 3/2019 | Ioannidis | ............... | H01Q 19/192 |
| 2006/0227851 A1* | 10/2006 | Shattil | ............... | H04B 1/7174 |
| | | | | 375/133 |
| 2009/0079617 A1* | 3/2009 | Shirakawa | ............... | G01S 13/87 |
| | | | | 342/146 |
| 2009/0109086 A1* | 4/2009 | Krieger | ............... | G01S 13/904 |
| | | | | 342/25 F |
| 2009/0110033 A1* | 4/2009 | Shattil | ............... | H04J 14/0298 |
| | | | | 375/141 |
| 2010/0164784 A1* | 7/2010 | Longstaff | ............... | G01S 13/003 |
| | | | | 342/202 |
| 2010/0164785 A1* | 7/2010 | Gebert | ............... | H01Q 1/28 |
| | | | | 342/25 F |
| 2010/0204867 A1* | 8/2010 | Longstaff | ............... | G01S 13/003 |
| | | | | 701/26 |
| 2010/0328157 A1* | 12/2010 | Culkin | ............... | H01Q 21/061 |
| | | | | 342/372 |
| 2014/0197984 A1* | 7/2014 | Wang | ............... | G01S 13/288 |
| | | | | 342/202 |
| 2015/0198701 A1* | 7/2015 | Dolgin | ............... | G01S 13/42 |
| | | | | 342/368 |
| 2017/0131399 A1* | 5/2017 | Ioannidis | ............... | G01S 13/89 |
| 2020/0003889 A1* | 1/2020 | Scott | ............... | G01S 13/751 |

* cited by examiner

DISTRIBUTED CLUTTER MOTION SUPPRESSION THROUGH MULTIPLE MOVING TRANSMIT PHASE CENTERS

FIELD OF THE INVENTION

The present invention relates generally to the field of RF communication systems, and particularly to radar systems.

TECHNICAL BACKGROUND

A radar is a system that uses electromagnetic waves to detect objects within a certain spatial volume. A radar system may be used to determine the range, altitude, direction, and/or speed of fixed objects, or objects that are moving through the spatial volume of interest. Radar systems have been used to identify and/or track various and disparate objects such as aircraft, ships, motor vehicles, weather formations, terrain, and baseballs. The term "radar" is an acronym for "RAdio Detection And Ranging." As the name implies, a radar system transmits radio waves into the spatial volume referred to above. If and when a radio wave comes in contact with an object in space, the radio wave will be reflected and scattered by the object. Thus, a reflected signal is propagated back toward the radar system. The radar system receives the reflected radio wave and detects the object. Of course, a radar system is typically configured to transmit many radio pulses into the spatial volume every second. Each of these pulses are received and detected by the radar system. By comparing these pulses the radar system can determine if the object is moving, and if moving, its speed and direction.

It is of particular interest in radar applications to detect targets that are moving on the ground. Radars that detect these targets are typically known as Ground Moving Target Indication Radar (GMTI). Detecting ground moving targets is particularly difficult from a moving platform, such as an airplane, where the detection of slow targets in clutter is generally limited by the angular resolution available from the antenna beamwidth and the velocity of the platform. The motion of the antenna and the beamwidth limit the lowest minimum detectable velocity of a target (i.e., the lowest velocity that a target is distinguishable from clutter). Thus, it is difficult to detect very slow moving targets or to detect targets from a fast-moving platform such as an airplane.

Accordingly, there is a need in the art for a radar system that minimizes the velocity of the transmit phase center relative to clutter and which limits the antenna beamwidth.

SUMMARY

This application is related to a system and method for reducing the velocity of the transmit phase center of a radar system relative to clutter, and to reduce the antenna beamwidth. In an embodiment, this application describes a transmit-subarrayed MIMO radar, which allows for the construction of a virtual aperture that is larger than the physical antenna, reducing the antenna beamwidth (beamwidth is inversely related to the size of the antenna aperture). Furthermore, embodiments described in this application require that the transmit phase centers be shifted in a direction opposite the motion of the moving platform, for each transmit, reducing their velocity with respect to clutter. In some embodiments, this allows for each transmit phase center to be effectively stationary with respect to clutter. These embodiments serve to improve the detection of ground moving targets, and, in particular, to enable the detection of slower moving targets or detection from a faster moving platform.

According to an aspect, a radar system includes an antenna array mounted on a carrier moving in a first direction, the antenna array including a plurality of antenna elements; and a transmitter portion coupled to the antenna array, the transmitter portion being configured to transmit a plurality of transmit beams, each of the plurality of transmit beams including a corresponding orthogonal transmit waveform of a plurality of orthogonal transmit waveforms, each of the plurality of transmit beams having a transmit phase center that is spatially located at a respective point along the antenna array, the transmitter portion being configured to transmit each transmit beam during each pulse repetition interval of a plurality of pulse repetition intervals; wherein the transmitter portion is configured to shift the respective transmit phase center of each transmit beam for each pulse repetition interval to a respective point along the antenna array in a direction opposite the first direction such that a speed of the respective transmit phase center of each beam remains is reduced.

The speed of the respective transmit phase center of each beam may be reduced such that the respective transmit phase center of each beam is effectively stationary in space for each transmit. The transmitter portion may be configured to cease transmitting any transmit beam of the plurality of the transmit beams having a transmit phase center that is shifted beyond a predetermined point of the antenna array and to introduce anew transmit beam for each transmit beam ceased to be transmitted, such that a predetermined number of transmit beams are transmitted for each transmit. Each new transmit beam may use a waveform previously corresponding to a transmit beam of the plurality of transmit beams that has ceased to be transmitted. The predetermined point of the antenna array may be the end of the antenna array. The antenna array may include a plurality of transmit antenna subarrays, each of the plurality of transmit antenna subarrays corresponding to one of the plurality of transmit phase centers. The transmit phase center of one of the plurality of transmit beams may be co-located with one of the plurality of antenna elements.

In an embodiment, the radar system may include a receiver portion coupled to the antenna array, the receiver portion being configured to extract a plurality of orthogonal receive signal components from a received signal provided by the antenna array, the plurality of orthogonal receive signal components corresponding to the plurality of orthogonal transmit waveforms. The receiver portion may be configured to detect ground moving targets based on the orthogonal receive signal components. The receiver portion may be configured to generate a synthetic aperture radar map based on the extracted orthogonal receive signal components.

According to an aspect, a method for suppressing distributed clutter includes the steps of: providing an antenna array mounted on a carrier moving in a first direction and including a plurality of antenna elements and a transmitter portion coupled to the antenna array; transmitting a plurality of transmit beams, each of the plurality of transmit beams including a corresponding orthogonal transmit waveform of a plurality of orthogonal transmit waveforms, each of the plurality of transmit beams having a transmit phase center that is spatially located at a respective point along the antenna array, wherein each transmit beam is transmitted during at least a portion of each pulse repetition interval of a plurality of pulse repetition intervals; and shifting the respective transmit phase center of each transmit beam for each pulse repetition interval to a respective point along the antenna array in a direction opposite the movement of the carrier, such that a speed of the respective transmit phase center of each beam remains is reduced. The speed of the respective transmit phase center of each beam may be reduced such that the respective transmit phase center of each beam is effectively stationary in space for each transmit.

In an embodiment, the method further includes the steps of: ceasing to transmit any transmit beam of the plurality of the transmit beams having a transmit phase center that is shifted beyond a predetermined point of the antenna array transmitting a new beam for each transmit beam ceased to be transmitted, such that a predetermined number of transmit beams are transmitted for each transmit. The antenna array may include a plurality of transmit antenna subarrays, each of the plurality of transmit antenna subarrays corresponding to one of the plurality of transmit antenna transmit phase centers. The transmit phase center of one of the plurality of transmit beams may be co-located with one of the plurality of antenna elements.

In an embodiment, the method further includes the steps of: providing a receiver portion coupled to the antenna array; extracting a plurality of orthogonal receive signal components from a received signal provided by the antenna array, the plurality of orthogonal receive signal components corresponding to the plurality of orthogonal transmit waveforms. Each new transmit beam may use a waveform previously corresponding to a transmit beam of the plurality of transmit beams that has ceased to be transmitted. The predetermined point of the antenna array may be an end of the antenna array.

In the embodiment, the method further includes the steps of: detecting ground moving targets based on the extracted orthogonal receive signal components.

In an embodiment, the method further includes the steps of generating a synthetic aperture radar map based on the extracted orthogonal receive signal components.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely examples of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and, together with the description serve to explain the principles and operation of the invention.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts.

As a result of the various embodiments described herein, distributed clutter motion may be suppressed through multiple moving transmit phase centers.

Figure 1A:
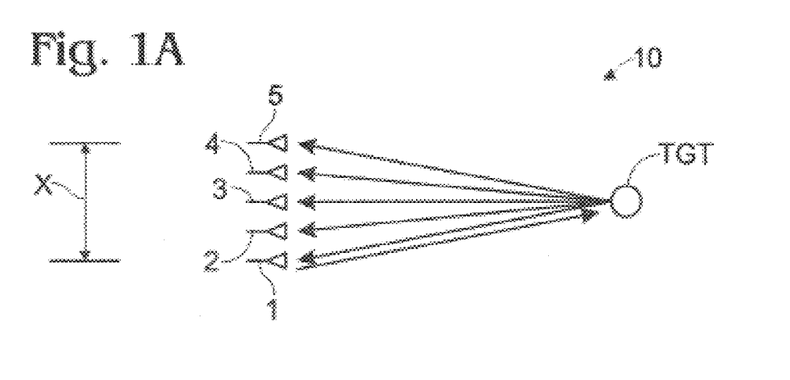
FIG. 1A provides a diagrammatic depiction of a virtual array in accordance with an embodiment of the present invention.
Figure 1B:
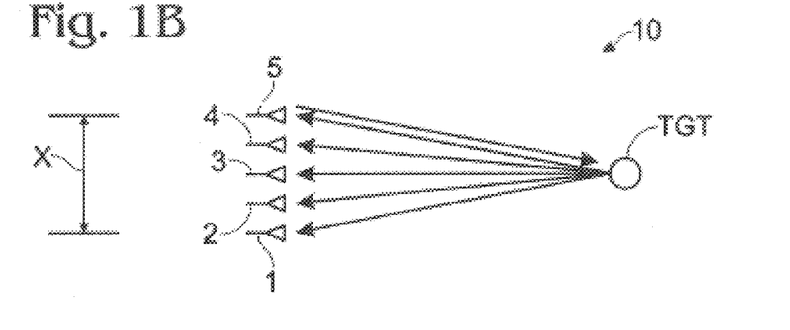
FIG. 1B provides a diagrammatic depiction of a virtual array in accordance with an embodiment of the present invention.
Figure 1C:
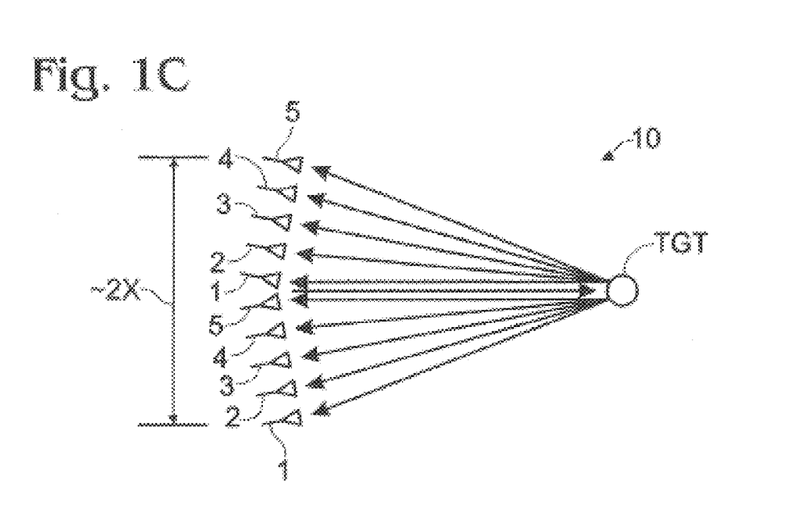
FIG. 1C provides a diagrammatic depiction of a virtual array in accordance with an embodiment of the present invention.

As embodied herein, and depicted in FIGS. 1A-1C, a diagrammatic depiction of a virtual array in accordance with the present invention is disclosed. FIGS. 1A-1C show a linear array of five antenna elements 1-5 and illustrates the benefit of using multiple transmit subarrays. In FIG. 1A, antenna element 1 is used as both a transmit phase center and a receive element. Antenna elements 2-5 are only used to receive. In FIG. 1B, antenna element 5 is used as both a transmit phase center and a receive element. Antenna elements 1-4 are only used to receive. If elements 1 and 5 transmit orthogonal waveforms, the virtual receive array shown in FIG. 1C is created. Note that the number of orthogonal waveforms is the number of unrelated waveforms simultaneously transmitted during the transmit portion of the radar cycle.

The upper limit of a virtual array size shown for an N element linear array can be as high as (2N−1) in that dimension. When the orthogonal waveforms are processed jointly, the different transmit locations form a virtual antenna that is larger than the physical antenna used to capture the reflected energy during the receiver portion of the radar cycle. In other words, the present invention may be used to provide smaller beamwidths than would otherwise be possible if the transmit array included only one transmit phase center.

In both FIG. 1A and FIG. 1B the linear antenna array is a distance of "x" units. By selecting the transmit phase centers at either end of the array, the distance (x) between transmit phase centers (1, 5) is maximized. The virtual array shown in FIG. 1C is almost doubled to a distance of about "2x," and is nine elements wide. The geometric diversity of transmit phase centers 1 and 5 helps create the virtual array depicted in FIG. 1C. Of course, a transmit phase center need not be co-located with particular element. Instead, a transmit phase center may be translated according to modulation of the amplitude of elements.

It will be apparent to those of ordinary skill in the pertinent art that modifications and variations can be made to the antenna elements 1-5 shown in FIGS. 1A-1C, and described above, depending on a variety of factors. One or all of the antenna elements 1-5 may be implemented using any suitable antenna structures such as circular aperture antennas, linear or planar arrays of antennas, electronically steered antenna arrays, phased array antenna structures, etc.

Figure 2:
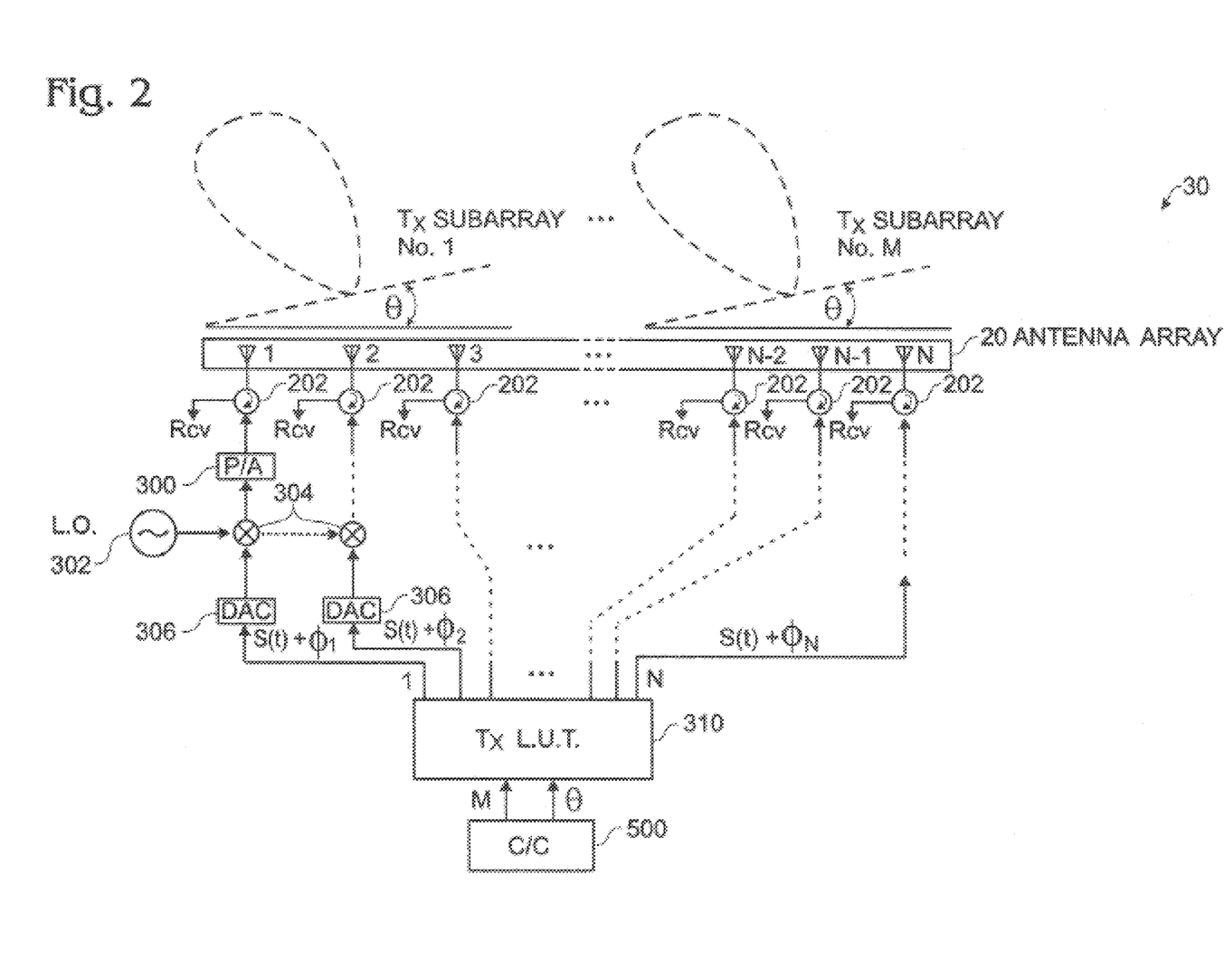
FIG. 2 is a block diagram of a transmitter portion of a radar system in accordance with another embodiment of the present invention.

As embodied herein and depicted in FIG. 2, a block diagram of a transmitter portion 30 of a radar system in accordance with another embodiment of the present invention is disclosed. In this example embodiment, the transmitter portion 30 is coupled to a phased array antenna 20 having antenna elements 1-N in the antenna array, N being an integer value. The antenna elements maybe separated by a distance substantially equal to λ/2, where λ is the wavelength associated with carrier frequency of the transmitted beam. This disclosure is not to be construed as being limited to this value as other spacings may be employed. The gain of a radar antenna can be calculated as:

$$G = \frac{4\pi \cdot A_e}{\lambda^2},$$

where G is the gain of the antenna, $A_e$ is the effective aperture, and λ is the wavelength of the antenna. The gain from the $i^{th}$ transmit subarray of the radar system is then:

$$G_i = \frac{4\pi \cdot M_x \cdot dx \cdot M_y \cdot dy \cdot \rho}{\lambda^2},$$

where $M_x$ is the number of elements in the X dimension of the subarray, $M_y$ is the number of elements in the Y dimension of the subarray, dx is the element spacing in the X dimension, dy is the element spacing in the Y dimension, and ρ is the aperture efficiency of the system. M and N can be chosen to fill any sized angular volume substantially without any beam spoiling inefficiencies, allowing the radar system to efficiently search the desired volume while taking advantage of the increased Doppler resolution and angular accuracy inherent with the processing described above. The radar system of the present invention may be dynamically tuned to optimize energy management, sensitivity over a given search sector and receive angular resolution.

In any event, those of ordinary skill in the art will understand that antenna elements 1-N in phased array antenna 20 may be arranged using any suitable geometry including a linear phased array, a rectangular phased array, a planar array or any other suitable geometric phased array of antenna elements.

The command/control portion 500 of radar system 10 is configured to dynamically reconfigured the system 10 to include M transmit subarrays, where M is an integer value. Command/control circuit 500 provides, for example, a look-up-table (LUT) 310 with the number of desired subarrays and the angular offset (θ) of the transmitted wavefront. LUT 310 provides the appropriate set of N transmit waveforms for each antenna element (1-N) in response to receiving any value of M and θ. Each transmit subarray coherently generates a single beam that includes one of the M orthogonal signals and is further characterized by a predetermined beamwidth and a predetermined angular wavefront offset (θ).

Subsequently, each of the N-predetermined signals is directed to a corresponding digital to analog converter (DAC) 306. The analog baseband signal is upconverted by mixer 304. The local oscillator 302 provides the mixer 304 with the appropriate RF frequency. The mixer modulates the baseband signal and the RF signal is amplified by power amplifier 300. The amplified RF signal is directed to its corresponding antenna element (1-N) via circulator 202. Practically speaking, the number of subarrays M is typically less than or equal to N/2 if the beam radiated by the subarray is to have any gain or directivity.

Again, the beamwidth and gain of the transmitted beam is determined by the number of elements in the subarray, which in turn, determines the number of transmit subarrays M and the number of orthogonal beams. In the illustrative diagram of FIG. 2, only the first transmit channel associated with antenna element 1 is fully shown. The diagrammatic depiction for each transmit channel for elements 2-N is omitted for the sake of brevity. Those of ordinary skill in the art will also understand that the principles of the present invention should not be construed as being limited to the embodiment depicted in FIG. 2.

Figure 3:
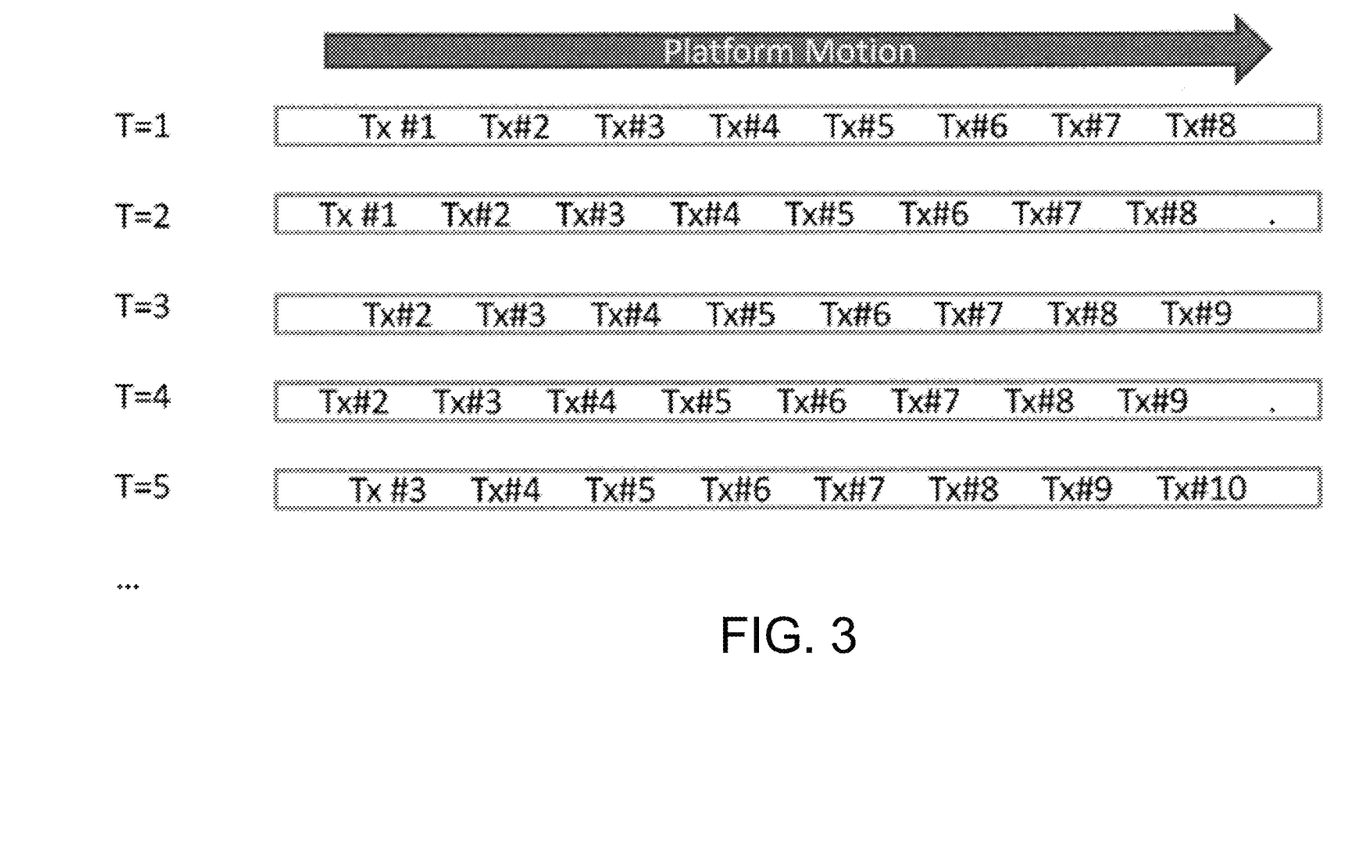
FIG. 3 is a diagram of transmit subarrayed antenna array over the course of multiple pulse repetition intervals, according to an embodiment.

As shown in FIG. 3, radar system 10 may be mounted on a moving platform. The moving platform, in an embodiment, may be an airplane, but in other embodiments may be a ship, automotive vehicle, trailer, or any other moving body to which radar system 10 may be attached. Radar system 10 may be used for any radar for which the radar antenna is in motion with respect to distributed clutter. Radar system 10 may be configured to detect targets for which the unmitigated range-Doppler of the target is overlapped with the clutter.

As described in connection with FIGS. 1A-1C and FIG. 2, transmit portion 30 and antenna array 20 may be configured to transmit a plurality of transmit beams each including a corresponding orthogonal transmit waveform. Each transmit beam has a transmit phase center that is spatially located at a respective point along the antenna array 20. Each transmit beam will be transmitted during a portion of each pulse repetition interval. To compensate for the motion of the platform, at each pulse repetition interval, the transmit phase center of each transmit beam may be "walked" down the antenna in the direction opposite the motion of the carrier, such that each transmit beam is transmitted from substantially the same point in space with respect to clutter for each pulse repetition interval (i.e. the transmit beam is effectively stationary with respect to clutter). Here, "effectively stationary" suggests that the transmit beam is transmitted from a point in space that is nearly the same for each transmit. This takes into account the fact that platform will move while each beam is transmitted and that small variations in the speed of the aircraft may prevent each transmit beam from being transmitted exactly at the same point.

FIG. 3 depicts an example of the "walking" motion of the transmit phase center of each transmit beam over a plurality of pulse repetition intervals. At T=1 (i.e., the first interval) antenna 20 radiates eight beams, Tx#1-Tx#8. As shown at T=1, Tx#1 is the left-most transmit beam while Tx#8 is the right-most transmit beam. At T=2, the respective transmit phase centers of each transmit beam are shifted to the left in order to compensate for the motion of the platform. Stated another way, from T=1 to T=2, the platform has moved some distance. To transmit the same transmit beam from the same location in space, the transmit phase center of the transmit beam must be moved the same distance the platform has traveled, in the opposite direction.

In an embodiment, the distance each transmit phase center should be shifted may be calculated by multiplying the speed of the platform by the time between transmits (i.e, the pulse repetition frequency). For example, if radar system 10 is mounted to an airplane moving at 250 m/s and radar system 10 has a pulse repetition frequency of 10 KHz, then the transmit phase center of each transmit beam should shift 2.5 cm between consecutive transmits. Of course, these numbers are for illustrative purposes only and should not be considered to limit the invention in any way.

Looking at the next pulse repetition interval, T=3, each transmit phase center has shifted further in the direction opposite the motion of the transmit phase center. As a result, the transmit phase center of transmit beam Tx#1 has extended beyond the edge of antenna array 20, and, thus, is no longer transmitted (in order to transmit from the same point in space as the previous transmits). At the other end of antenna array 20, a new transmit beam is now being transmitted: transmit beam Tx#9. Over the next several pulse repetition intervals, transmit beam Tx#9 will similarly walk down the antenna array as the platform continues to move forward. This process is repeated as each transmit beam reaches the end of the antenna array, a new transmit beam is introduced at the right-most side of the antenna array such that a predetermined number of transmit beams will transmit for any given pulse repetition interval. (The terms right and left or right-most and left-most, as used here, refer to respective directions of FIG. 3 and are merely used for example). In other words, in the example used above, if the distance between the transmit phase center of the left-most transmit beam and the end of the array is less than the distance the left-most transmit beam is to be shifted, the left-most transmit beam ceases to be transmitted, and a new transmit beam is introduced at the right-most side. This process can be shown to repeat again at T=4, where a new transmit beam with a new orthogonal transmit waveform, transmit beam Tx#10, is transmitted with a transmit phase center previously occupied by transmit beam Tx#9, and Tx#2 is no longer transmitted because its transmit phase center is now beyond the edge of antenna array 20.

One of ordinary skill will appreciate that it is not necessary to transmit each transmit phase center at a point that renders the transmit phase center substantially stationary. In alternate embodiments, the transmit phase center of each transmit beam is moved in a direction opposite the motion of the platform at a rate sufficient to reduce the motion of the transmit phase center, if not necessarily render it effectively stationary. Returning to the above example, instead of shifting each transmit phase center 2.5 cm, each transmit phase center may be shifted by any value less than the 2.5 cm. The velocity of the transmit phase centers may be varied to balance the available coherent pulse integration duration (which is a function of the antenna length) with other properties such as Doppler resolution. Furthermore, in an embodiment, the coherent pulse integration duration (i.e., dwell) may be limited to the array extent divided by the platform velocity, as minimum detectable velocity degrades as dwells increase.

Orthogonal waveforms (e.g., codes) may be reused assuming that the time separation is sufficient to avoid significant returns of the same codes. For example, returning to FIG. 3, once the orthogonal waveform associated with transmit beam Tx#1 has ceased to transmit for a period of time sufficient to avoid any returns resulting from the most recent transmit of Tx#1, the orthogonal waveform may once again be used in a current transmit beam.

Figure 4:
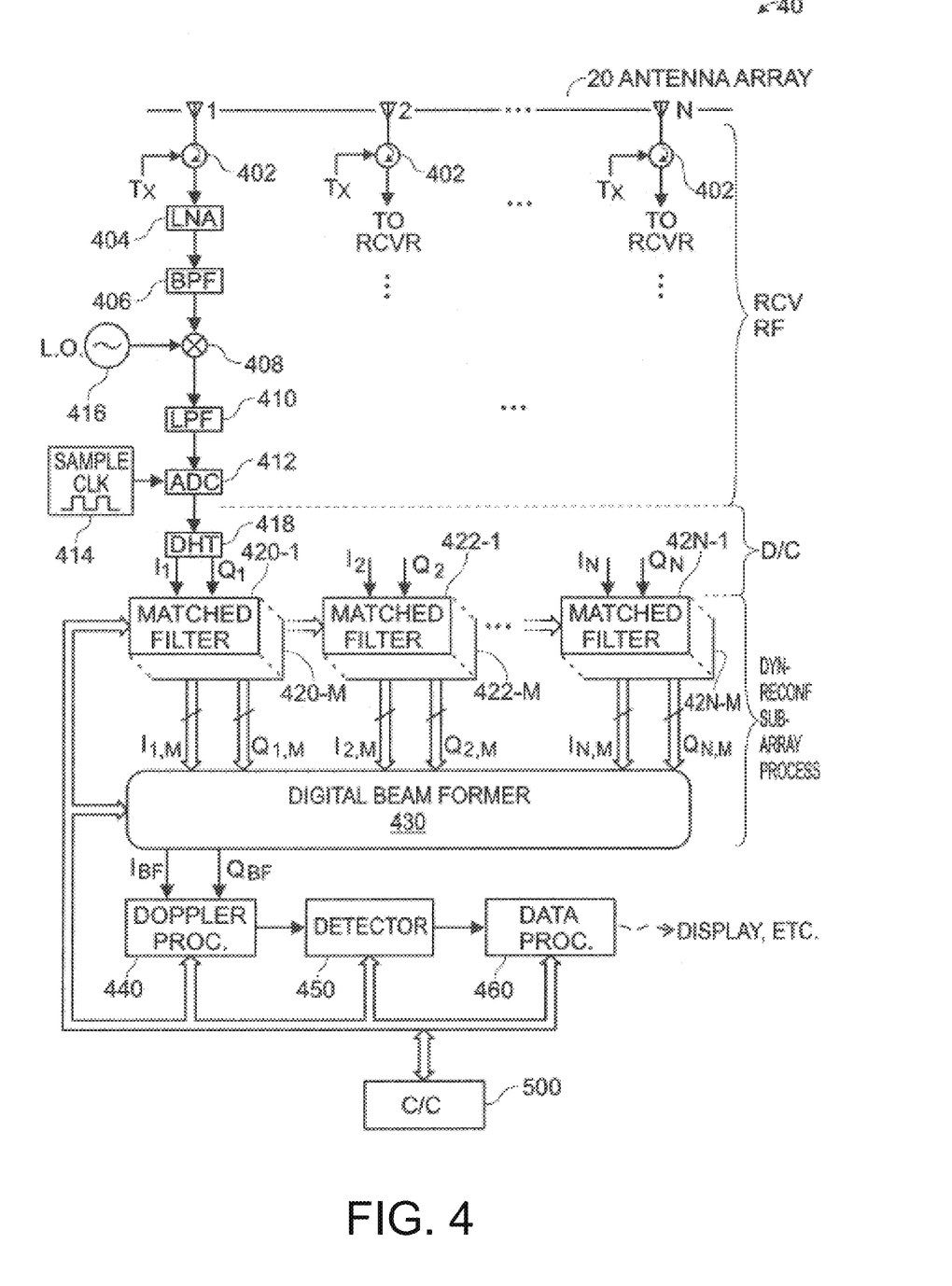
FIG. 4 is a block diagram of a receiver portion of a radar system in accordance with the embodiment depicted in FIG. 2.
Figure 5:
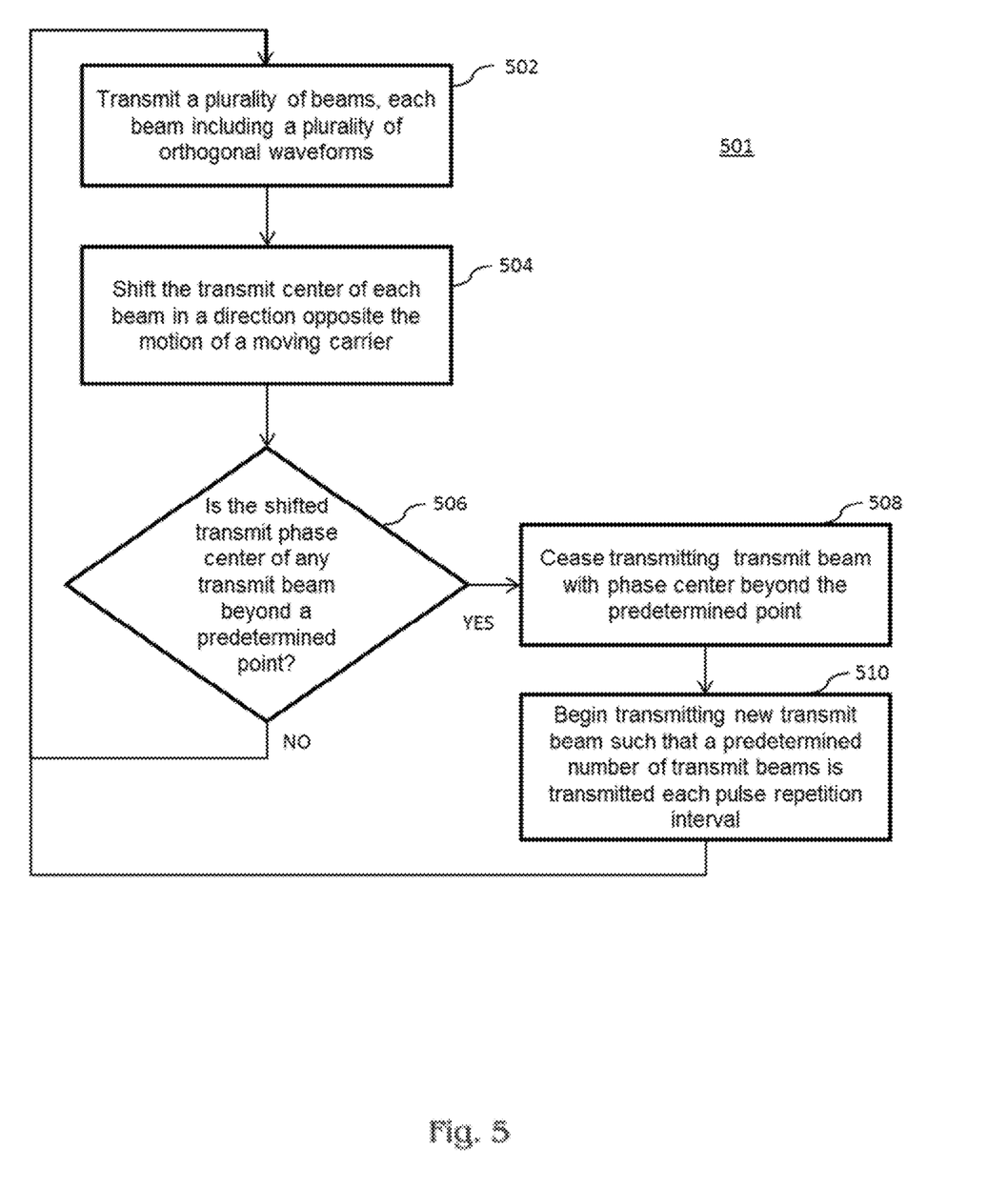
FIG. 5 is a flowchart of a method according to an embodiment.

Referring now to FIG. 5, there is shown a flowchart of a method 501 in accordance with an embodiment. The steps of flowchart 501 may be completed with radar system 10 and transmit portion 30 and receiver portion 40 as described in connection with FIGS. 1, 2, and 4. However, one of ordinary skill in the art will appreciate that radar system 10, transmit portion 30, and receiver portion 40 are just examples of a system that could be used to perform the steps of flowchart 501 and different systems or variations on those systems may be used to complete the steps.

In step 502, a plurality of beams are transmitted, each of the beams including a plurality of orthogonal waveforms. The beams may be transmitted as described above, in conjunction with an antenna array and transmit portion, such as antenna array 20 and transmitter portion 30. Each beam, respectively, will have a transmit phase center that need not be co-located with an antenna element. The transmit phase centers may be defined by subarraying an array of antenna elements. As described above, the antenna may be mounted to a moving platform such as an airplane, a ship, a vehicle, or trailer, etc.

In step 504, the transmit center of each beam is shifted in a direction opposite the motion of a moving carrier. According to an embodiment, each transmit beam is shifted by a distance effective to render the transmit beam effectively stationary for each transmit. As described above, this may be accomplished by shifting the transmit phase center by a distance equal to speed of the carrier multiplied by the time in between transmits (i.e, the pulse repetition frequency). In an alternative embodiment, each transmit phase center may be shifted by a distance less than the speed of the carrier multiplied by the time in between transmits. In either case, the speed of the transmit phase center will be slowed with respect to the clutter.

In steps 506 and 508, if the shifted transmit phase center of any transmit beam is beyond a predetermined point on the antenna array, that transmit beam the transmit beam may cease to be transmitted. In an embodiment, the predetermined point may be the end of the antenna array. In an alternate embodiment, it may be a point before the end of the antenna array.

In step 510, for each transmit beam ceased to be transmitted in step 508, a new transmit beam is formed to be transmitted in step 502. This ensures that a predetermined number of transmit beams will be transmitted during each pulse repetition interval.

As embodied herein and depicted in FIG. 4, a block diagram of a receiver portion of a radar system in accordance with the embodiment depicted in FIG. 2 is disclosed. Thus, the antenna 20 includes antenna elements 1–N. As before, the antenna element 1 is connected to circulator device 202. The received energy is thereby directed to low noise amplifier 404. The amplified received signal is then directed to bandpass filter 406. The filtered RF signal is downconverted by mixer 408 whereby the filtered RF signal is multiplied by an appropriate signal provided by local oscillator 416. The downconverted signal is directed to low pass filter 410 which removes unwanted harmonics from the received analog baseband signal. Next, the analog signal is converted into a baseband digital signal by analog-to-digital converter (ADC) 412. ADC 412 provides discrete digital samples of the received signal in accordance with the sampling clock 414. Those of ordinary skill in the art will understand the same operations described above relative to the first receive channel are also being performed in parallel by receive channels 2–N. Thus, there are N digital baseband samples being generated during every sampling clock period. It should also be mentioned at this point that all timing components such as clocks and oscillators in both the transmitter and receiver are derived from the same timing source such that system 10 is phase coherent.

Each digital baseband signal is directed into a digital Hilbert transform, which is typically implemented in software. As those of ordinary skill in the art will appreciate, the Hilbert transform is employed to shift a given signal by +/−90 degrees. Thus, the output of DHT 418 provides the in-phase component i[n] and the quadrature component q[n] for a given signal sample r[n]. Thus, a quadrature version of the signal sample r[n] is provided to the matched filter 420 in the rectangular form r[n]=i[n]+jq[n]. Those skilled in the art will understand that the quadrature signal may also be expressed as r[n]=M exp (jφ), where M is the square root of the sum of the square of i[n] and q[n]. This is mentioned because the quadrature signals i[n] and q[n] provide important phase information that is utilized in both the matched filters and the beam former 430.

The matched filter bank for channel one (1) is shown to include matched filters [420-1, 420-2 . . . 420-M]. Thus, when the command/control portion 500 provides LUT 310 (see FIG. 2) with parameter M, it also dynamically reconfigures the receiver 40 by providing a predetermined orthogonal transmit signal to matched filter 420-1, a second predetermined orthogonal transmit signal to matched filter 420-2, and so on and so forth. Thus, the matched filter bank for every channel (1–N) must include a matched filter for each one of the M-orthogonal signals. As those of ordinary skill in the art will appreciate, a matched filter performs a cross-correlation of the orthogonal signal and the received signal sample. If a time delayed and attenuated version of the orthogonal signal is present in the received signal, the matched filter output is at a maximum. If a time delayed and attenuated version of the orthogonal signal is not present in the received signal, the cross-correlation yields a smaller value (e.g., there is noise in the received signal). In particular, if a signal is present, there is a matched filter gain of (pulse width)×(bandwidth) out of the matched filter. Thus, e.g., a 10 microsecond pulse having a 20 MHz bandwidth will receive 23 dB more gain out of the matched filter than a random noise signal. As shown in the drawing, the matched filter bank for each channel (1–N) will provide an in-phase vector $I_{(1-N),M}$ and a quadrature-phase vector $Q_{(1-N), M}$ based on the received signals provided by antenna elements 1–N.

In the next processing step, the digital beam former 430 will receive N–I and Q vectors from the N matched filter banks, N being an integer. The digital beam former 430 is configured to multiply each in-phase and quadrature pair with an appropriate complex weighting function $a_k$ exp (j$φ_k$). The amplitude and phase of each antenna element are controlled by the complex weighting function for a variety of reasons. If a detected target is spatially offset from the center bore of the radiated beam, for example, the digital beam former 430 will make the necessary adjustments. The beam former 430 may also be employed to adjust the level of signal sidelobes, etc. In any event, the matched filter banks in the previous processing stage provide the beam former 430 with the data from M virtual radars that are spatially offset from each other. The geometry provided by the transmit subarrays enable the beam former 430 to provide significantly improved accuracy.

To be clear, the digital beam former performs its function before a target is detected. Generally the beam locations, and hence the weighting function, are chosen in one of two ways. In the first way, the beam former may execute a predetermined order of beam positions with the hope of finding a target. In the second way, if there is a dedicated track, i.e., a target of interest has been previously detected, a receive beam may be steered to the exact location of the previously identified track with the hope of detecting it again. Both methods multiply each in-phase and quadrature pair with an appropriate complex weighting function $a_k$ exp (j$φ_k$).

The digital beam former 430, in turn, provides an in-phase and quadrature output to the Doppler processor 440. Doppler processor 440 uses the input samples from the beam former 430 to generate target velocity measurements and provides coherent gain by integrating returns from multiple pulses. The detector estimates the position of the target using a predetermined statistical formula. The information generated by the processing elements of the receiver are directed to the data processor block 460 which, in turn, formulates the data for display and other such uses. As alluded to above, the command/control block 500 is also configured to adjust the weighted complex coefficients of the digital beam former 430 in response to inputs from Doppler processor 440 and detector 450.

The matched filter banks described above employ code orthogonal waveforms, i.e., intrapulse coding, but the present invention should not be construed as being limited to this method. As those of ordinary skill in the art will appreciate, the main ways to achieve orthogonality are through intrapulse coding, time, frequency, and Doppler coding. In each method, the waveforms simultaneously transmitted by each subarray are orthogonally coded such that they may be identified by the matched filter. If time is employed, the sub-arrays are cycled through one Pulse Repetition Interval (PRI) at a time. The data is processed in a conventional manner for each subarray up until the beam former portion of the receiver. The data is stored in memory until all sub-arrays are completed, and then the beam is formed. If frequency orthogonal waveforms are employed (that is transmitting each waveform at a different RF frequency), the signal identification be done somewhere other than the matched filter, e.g., by using a bank of multiple DHT filters. This method would reduce the bandwidth through the processing chain by not requiring the full radiated bandwidth (including all multiple frequency orthogonal waveforms) to be processed by the matched filter. Thus, with each sub-arrays transmitting at a different RF frequency, the receiver is open (from a bandwidth perspective) to receive contributions from all transmitted waveforms. In this method, the waveforms are separated out either at the DHT or by the matched filter and then processed in the beam former. This method typically requires a beam former process that is slightly more complicated.

If Doppler coding is used, each sub-array waveform is transmitted with a different pulse-to-pulse phase shift. In this method, the Doppler processing is configured to isolate the sub-array waveforms.

In addition to the above embodiments, the receiver portion may be configured to process for synthetic aperture radar (SAR), using the input samples from the beam former 430. One of ordinary skill in the art would appreciate that, to generate a synthetic aperture radar map, it would only be necessary to store the received data position and the location of the associated transmit phase center.

Each of these methods has its own advantages and disadvantages, depending on the application. Each approach has implications with respect to the transmit hardware and receive architecture, and each approach also has an impact on the overall processing architecture. Irrespective of the means used to achieve orthogonality, the present invention is configured to optimize energy and adapt the processing architecture to different numbers of orthogonal sets.

With respect to the embodiments described in FIGS. 1-4, those of ordinary skill in the art will appreciate that the dynamically reconfigurable processing functions of the present invention, such as matched filtering, beamforming, etc., are typically implemented using a digital signal processor that employs random access memory (RAM), read only memory (ROM), I/O circuitry, and communication interface circuitry coupled together by a bus system. The bus typically provides data, address, and control lines between the digital signal processor and the other system components. Moreover, processor functions may be implemented using hardware, software, general purpose processors, signal processors, RISC computers, application specific integrated circuits (ASICs), field programmable gate array (FPGA) devices, customized integrated circuits and/or a combination thereof. Thus, embodiments of the present invention are not limited to any specific combination of hardware circuitry and/or software. Taken together, RAM and ROM may be referred to herein as "computer-readable media." Further, the term "computer-readable medium," as used herein, refers to any medium that participates in providing data and/or instructions to the processor for execution. For example, the computer-readable media employed herein may include any suitable memory device including SRAM, DRAM, NVRWM, PROM, EROM, E2PROM, Flash memory, memory cards, flash drives, or any suitable type of memory. Non-volatile media may also include, for example, optical or magnetic disks as well as the aforementioned memory devices.

More information regarding transmit sub-arrayed MIMO radar may be found in U.S. Pat. No. 8,289,203, the entirety of which is incorporated herein by reference and which may be used to support the various embodiments and claims in this application.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A radar system comprising:
   an antenna array mounted on a carrier moving in a first direction, the antenna array including a plurality of antenna elements; and
   a transmitter portion coupled to the antenna array, the transmitter portion being configured to transmit a plurality of transmit beams, each of the plurality of transmit beams including a corresponding orthogonal transmit waveform of a plurality of orthogonal transmit waveforms, each of the plurality of transmit beams having a transmit phase center that is spatially located at a respective point along the antenna array, the transmitter portion being configured to transmit each transmit beam during each pulse repetition interval of a plurality of pulse repetition intervals;
   wherein the transmitter portion is configured to shift the respective transmit phase center of each transmit beam for each pulse repetition interval to a respective point along the antenna array in a direction opposite the first direction such that a speed of the respective transmit phase center of each beam remains is reduced;
   wherein the transmitter portion is configured to cease transmitting any transmit beam of the plurality of the transmit beams having a transmit phase center that is shifted beyond a predetermined point of the antenna array and to introduce a new transmit beam for each transmit beam ceased to be transmitted, such that a predetermined number of transmit beams are transmitted for each transmission cycle; and
   wherein each new transmit beam uses a waveform previously corresponding to a transmit beam of the plurality of transmit beams that has ceased to be transmitted.

2. The radar system of claim 1, wherein the speed of the respective transmit phase center of each beam is reduced such that the respective transmit phase center of each beam is effectively stationary in space for each transmission cycle.

3. The radar system of claim 1, wherein the predetermined point of the antenna array is the end of the antenna array.

4. The radar system of claim 1, wherein the antenna array includes a plurality of transmit antenna subarrays, each of the plurality of transmit antenna subarrays corresponding to one of the plurality of transmit phase centers.

5. The radar system of claim 1, wherein the transmit phase center of one of the plurality of transmit beams is co-located with one of the plurality of antenna elements.

6. The radar system of claim 1, further comprising:
   a receiver portion coupled to the antenna array, the receiver portion being configured to extract a plurality of orthogonal receive signal components from a received signal provided by the antenna array, the plurality of orthogonal receive signal components corresponding to the plurality of orthogonal transmit waveforms.

7. The radar system of claim 6, wherein the receiver portion is configured to detect ground moving targets based on the orthogonal receive signal components.

8. The radar system of claim 6, wherein the receiver portion is configured to generate a synthetic aperture radar map based on the extracted orthogonal receive signal components.

9. A method for suppressing distributed clutter, comprising the steps of:
- providing an antenna array mounted on a carrier moving in a first direction and including a plurality of antenna elements and a transmitter portion coupled to the antenna array;
- transmitting a plurality of transmit beams, each of the plurality of transmit beams including a corresponding orthogonal transmit waveform of a plurality of orthogonal transmit waveforms, each of the plurality of transmit beams having a transmit phase center that is spatially located at a respective point along the antenna array, wherein each transmit beam is transmitted during at least a portion of each pulse repetition interval of a plurality of pulse repetition intervals;
- shifting the respective transmit phase center of each transmit beam for each pulse repetition interval to a respective point along the antenna array in a direction opposite the movement of the carrier, such that a speed of the respective transmit phase center of each beam remains is reduced;
- ceasing to transmit any transmit beam of the plurality of the transmit beams having a transmit phase center that is shifted beyond a predetermined point of the antenna array
- transmitting a new beam for each transmit beam ceased to be transmitted, such that a predetermined number of transmit beams are transmitted for each transmission cycle, wherein each new transmit beam uses a waveform previously corresponding to a transmit beam of the plurality of transmit beams that has ceased to be transmitted.

10. The method of claim 9, wherein the speed of the respective transmit phase center of each beam is reduced such that the respective transmit phase center of each beam is effectively stationary in space for each transmission cycle.

11. The method of claim 9, wherein the predetermined point of the antenna array is an end of the antenna array.

12. The method of claim 9, wherein the antenna array includes a plurality of transmit antenna subarrays, each of the plurality of transmit antenna subarrays corresponding to one of the plurality of transmit antenna transmit phase centers.

13. The method of claim 9, wherein the transmit phase center of one of the plurality of transmit beams is co-located with one of the plurality of antenna elements.

14. The method of claim 9, further comprising the steps of:
- providing a receiver portion coupled to the antenna array;
- extracting a plurality of orthogonal receive signal components from a received signal provided by the antenna array, the plurality of orthogonal receive signal components corresponding to the plurality of orthogonal transmit waveforms.

15. The method of claim 14, further comprising the steps of:
- detecting ground moving targets based on the extracted orthogonal receive signal components.

16. The method of claim 14, further comprising the steps of:
- generating a synthetic aperture radar map based on the extracted orthogonal receive signal components.

* * * * *